United States Patent Office 3,517,378
Patented June 23, 1970

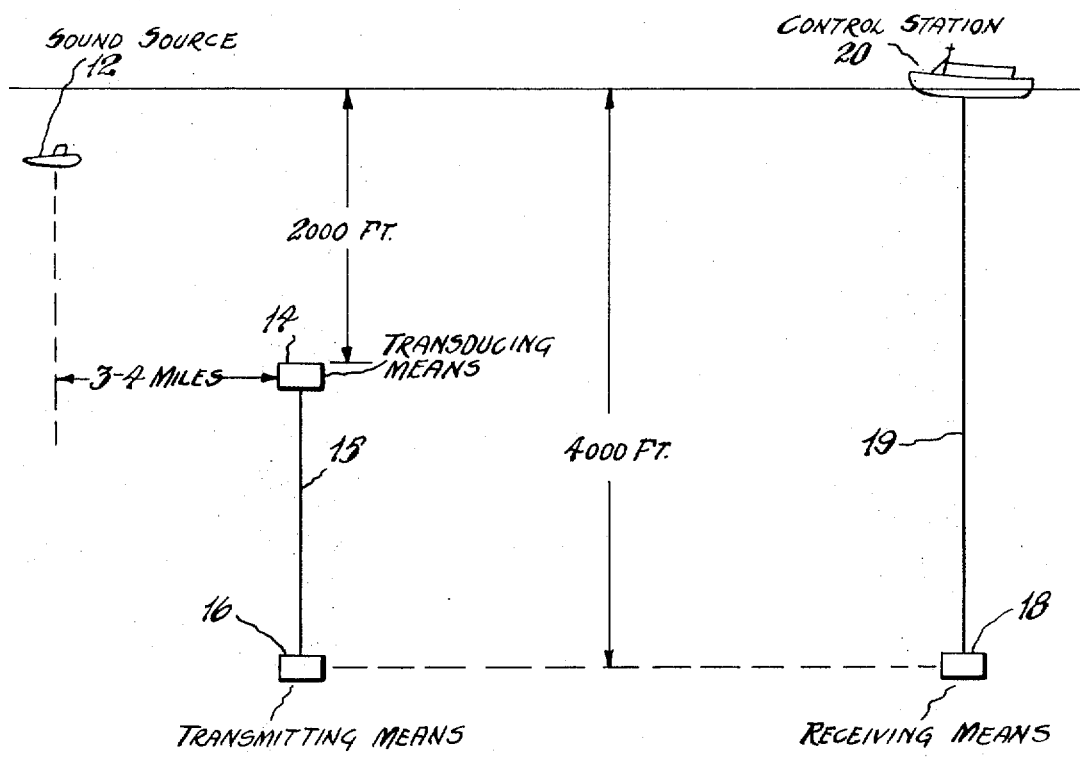

3,517,378
UNDERWATER LONG-DISTANCE SOUND-
DETECTION SYSTEM
Robert E. Barrett, New Haven, Conn., assignor, by mesne
assignments, to the United States of America as represented by the Secretary of the Navy
Filed Nov. 6, 1959, Ser. No. 851,480
Int. Cl. G01s 3/00
U.S. Cl. 340—5                                    3 Claims This invention relates to underwater sound detection and especially to an underwater sound-detection system and method capable of operating over long distances.

The detection of submarines at a distance is an important link in the chain of defense against their attack. It is obvious that detection at a great distance is highly desirable, in view of the capabilities of the modern submarine. The presence of a submarine may be disclosed by sounds which emanate from it. These sounds are propagated to a distance, whence they may be detected by a hydrophone, amplified, and presented in a suitable manner as intelligence. Sonic listening, as well as echo-ranging, is a well-known method of underwater location of objects.

However, the practical range of underwater sound detection systems is usually limited to a few miles because of the properties of the medium. Due to the downward refraction of sound as a result of the gradient of the velocity of sound, a hydrophone located more than a few miles from a sound source is generally in a shadow zone. This menas that hydrophones must be located within a few miles of the source of the sound in order to receive signals.

A phenomenon which can be utilized to increase the range of a sound detection system is the propagation of sound in sea water along rays which are subject to refraction by variations in sound velocity. In most areas of the oceans, the velocity of sound varies with depth and temperature, and is less at some intermediate depth than it is either at the surface or at the ocean bottom. These oceanographic conditions produce a "sound channel" having as its horizontal axis a level along which the velocity of sound reaches its minimum value. Essentially, the sound channel provides for a long-range transmission of sound between a sound source and a receiver where both types of sonic equipment are located at a level approximately corresponding to the axis of minimum velocity.

Considering the bathic aspects of the sound channel in greater detail, it is found that in going from a point just below the surface of sea water to increasingly greater depths, there occurs a decrease in temperature and a corresponding decrease in sound velocity. This effect continues through depths ranging from 300 to 700 fathoms. In this region, a minimum sound velocity level is reached beyond which little further temperature change is observed. Below the minimum velocity level, increasing pressure, with increasing depth, causes the velocity of sound to increase gradually at a relatively slower rate compared to its rate of decrease, and ultimately at very great depths of 2000 to 3000 fathoms to regain and exceed the initial velocity present just below the ocean surface.

Therefore, from a refraction point of view, variation of velocity with temperature may be regarded as forming an upper side or "roof" for the sound channel; variation of sound velocity with pressure may be regarded as forming a lower side or "floor" for the sound channel.

It has been discovered that a bathic sound channel may be utilized as a refracting medium to achieve two important objectives. One is the separation of a source of sound energy into a series of successively occurring sound impulses which are characterized by progressively greater intensity, leading up to an abrupt and highly identifiable endpoint. A second objective is to prevent loss of sound energy due to reflection of sound rays at the surface or bottom of the ocean, and thus to provide for long-range sound transmission.

Since the minimum sound velocity axis occurs at a relatively great depth (approximately 4000 feet), there is provided above and below this level a distance through which a limited number of sound rays may be completely refracted by the sound channel and may be turned back without ever reaching the surface or bottom of the ocean, thereby to furnish continuous paths along which it is believed that sound impulses may traverse great distances.

The efficiency of the sound channel for transmission of sounds over long distances provides an opportunity for realizing long range detection of underwater sounds.

The objects and advantages of the present invention are accomplished by utilizing the characteristics of the oceanic channel to transmit sounds over long underwater distances. A typical embodiment of the invention employs a sound transducer such as a hydrophone suspended between the surface of the ocean and the upper surface of the sound channel to pick up sounds emanating from the object to be detected, such as a submarine. A sound transmitter positioned within the oceanic sound channel is connected to the sound transducer by means of an electrical cable. A receiving transducer, also located within the sound channel many miles away from the transmitter, is connected by electrical cable to a control station which may be a ship sitting above the receiving transducer on the ocean surface. Sounds reecived by the sound transducer are re-propagated by the transmitter within the sound channel for distances in the order of hundreds of miles, picked up by the receiving transducer and sent to the control station where they can be evaluated. The transmitter and/or the receiving transducer may have directional characteristics for greater efficiency.

An object of this invention is to provide a method and means for accomplishing underwater listening or detection of underwater sounds where the listener is at a great distance from the source of the sounds.

Another object is to utilize the underwater sound channel for increasing the range of underwater sound detection systems.

Other objects and many of the attendant advantages of this invention will be readily appreciated as the same becomes better understood by reference to the following detailed description when considered in connection with the accompanying drawings wherein the single figure is a schematic diagram of an embodiment of the invention.

In the single figure, sound emanating from an underwater sound source 12, which may be a submarine for example, is picked up by transducing means 14, a conventional hydrophone for example, which is suspended between the surface of the ocean and the top surface, or roof, of the oceanic sound channel. A good choice for the depth of the transducing means 14 in order to maximize its pick-up range would be about 2000 feet below the ocean surface. At this depth, a conventional hydrophone has a range of about 3 to 4 miles around its vertical axis.

Transducing means 14 is connected by electrical cable 15 to transmitting means 16 which is located at a depth of about 4000 feet. This depth places it in the sound channel at approximately the depth of the axis of minimum velocity of sound transmission. Transducing means 16 comprises an amplifier and a sound transducer which may have directional characteristics.

The sound from transmitting means 16 is propagated within the sound channel for distances which may be in the order of hundreds of miles and is picked up by receiving means 18 which is also located in the sound channel at approximately the same depth as the transmitting means 16. Receiving means 18 comprises a conventional hydrophone and an amplifier, if necessary. The electrical output of receiving means 18 is connected by electrical cable 19 to any suitable indicator in a control station which may, for example, be a ship lying on the surface of the ocean. The indicator employed in the control station 20 may be a sonar set.

Anchoring of the transducing means-transmitting means combination can be accomplished by making the combination slightly buoyant and attaching a weight thereto with a light line.

If desired, the electrical cables 15 and 19 may be eliminated. Transducing means 14 would then comprise a receiving transducer, an amplifier and a transmitting transducer arranged to transmit sound vertically downward to the transmitting means 16. The latter would comprise similar components but the transmitting transducer would be arranged to transmit its sound output horizonally. The receiving means 18 would comprise similar components but the transmitting transducer would now be arranged to transmit sound vertically upward.

Obviously many modifications and variations of the present invention are possible in the light of the above teachings. It is therefore to be understood that within the scope of the appended claims the invention may be practiced otherwise than as specifically described.

I claim:

1. A method for underwater sound detection at great distances from a terminal receiving station comprising the steps of: receiving underwater sounds by means of a sound transducer located between the surface of the water and the roof of the underwater sound channel, converting said received sounds into electrical analog signals, coupling said analog signals to a transmitting means located within the underwater sound channel, re-converting said analog signals into corresponding sound signals and transmitting them within the underwater sound channel to a receiving transducer located remotely from said transmitting means, converting said transmitted sound signals into analog signals, and coupling said last-named analog signals to an indicating means.

2. An underwater sound detection system comprising, in combination: transducing means located between the surface of the water and the roof of the sound channel for receiving underwater sounds and transforming them into electrical analog signals; transmitting means located within the underwater sound channel approximately at the depth of minimum sound velocity for receiving said analog signals, re-converting them into corresponding sound signals and propagating said sound signals within the sound channel; and receiving means located remotely from, but approximately at the same underwater depth as, said transmitting means for receiving said transmitted sound signals and converting them into analog signals adapted to be fed to an indicating means.

3. An underwater sound detection system comprising, in combination: transducing means located between the surface of the water and the roof of the sound channel for receiving underwater sounds and transforming them into electrical analogs; transmitting means connected to said transducing means and located within the underwater sound channel approximately at the depth of minimum sound velocity for receiving said electrical analogs, reconverting them into sound signals and propagating said sound signals within said sound channel; and receiving means located remotely from, but approximately at the same underwater depth as, said transmitting means for receiving said transmitted sound signals and converting them into electrical analogs for use with an indicating means.

References Cited

UNITED STATES PATENTS

| | | | |
|---|---|---|---|
| 2,798,902 | 7/1957 | Kursman | 340—5 |
| 2,587,301 | 2/1952 | Ewing | 340—6 |
| 2,750,794 | 6/1956 | Downs | 340—2 |
| 2,760,180 | 8/1956 | Sipkin | 340—6 |
| 2,981,927 | 4/1961 | McKenney | 340—2 |

FOREIGN PATENTS

| | | |
|---|---|---|
| 702,567 | 1/1954 | Great Britain. |
| 1,163,407 | 9/1958 | France. |
| 1,024,854 | 2/1958 | Germany. |

RICHARD A. FARLEY, Primary Examiner

U.S. Cl. X.R.

340—6